UNITED STATES PATENT OFFICE.

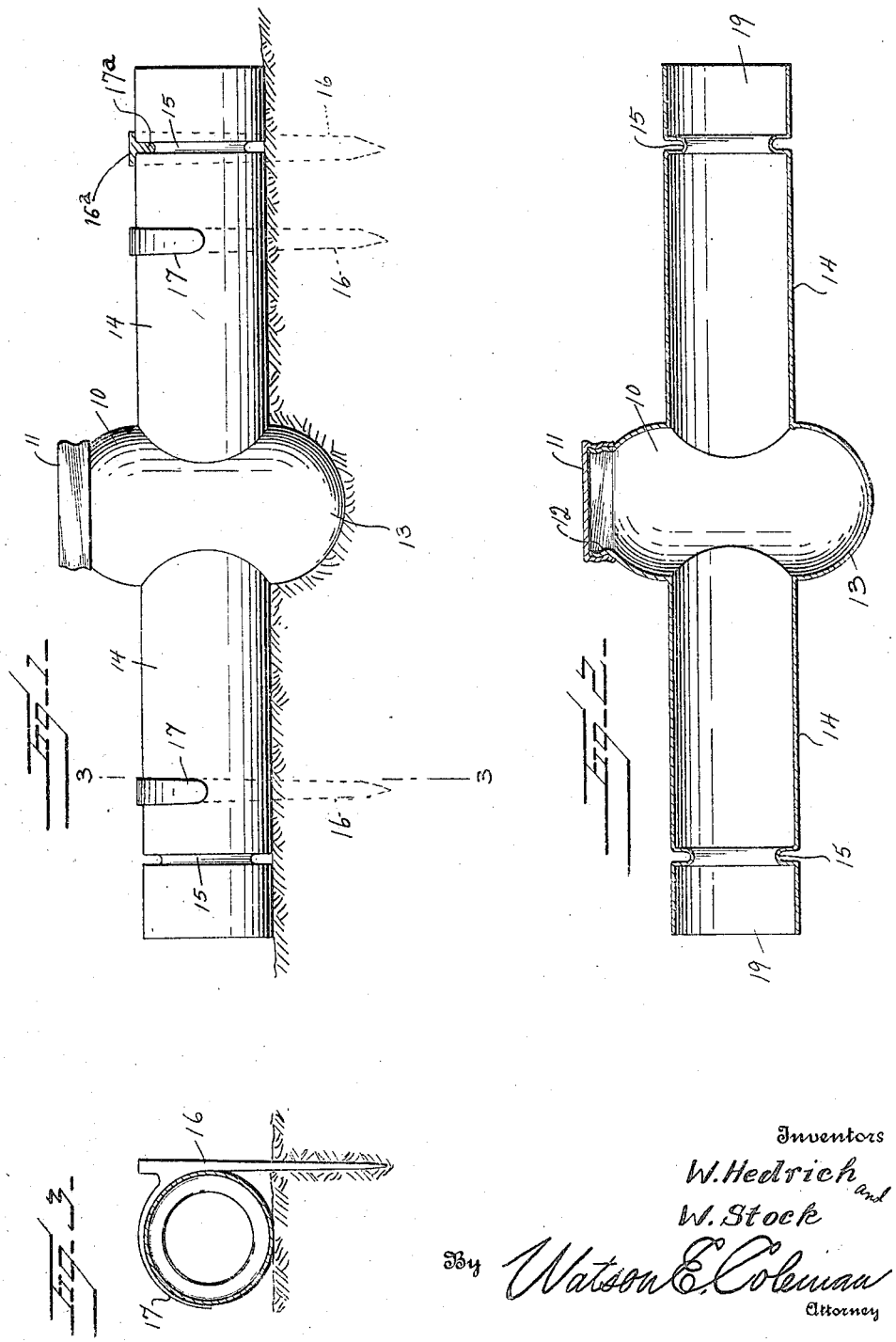

WILLIAM HEDRICH AND WALTER STOCK, OF TROCHU, ALBERTA, CANADA.

POISON-CONTAINING TRAP.

1,302,160.

Specification of Letters Patent. Patented Apr. 29, 1919.

Application filed January 18, 1919. Serial No. 271,793.

*To all whom it may concern:*

Be it known that we, WILLIAM HEDRICH and WALTER STOCK, citizens of the United States, residing at Trochu, in the Province of Alberta and Dominion of Canada, have invented certain new and useful Improvements in Poison-Containing Traps, of which the following is a specification, reference being had to the accompanying drawings.

This invention relates to improvements in traps, and particularly to traps for killing gophers and other small rodents and the general object of the invention is to provide a device of this character including a container for poison and a plurality of runways or passages leading to the container.

A further object is to so construct this trap or poison container that it will not be liable to be clogged up by dirt scratched into the openings of the passages, nor will the poison disposed within the container be likely to be carried out of the trap through said passages and thus be exposed to being devoured by other animals than those designed to be killed.

Still another object is to provide a device of this character having an opening through which poison may be placed within the container, this opening being normally closed by a screw cap.

Other objects will appear in the course of the following description.

Our invention is illustrated in the accompanying drawings, wherein:—

Figure 1 is a side elevation of a trap or poison container constructed in accordance with our invention;

Fig. 2 is a vertical sectional view thereof; and

Fig. 3 is a cross sectional view of the poison holder showing the anchoring means.

It is a common practice today in countries infested by gophers and like rodents to dispose poison mixed with food, such as grain, in front of the gopher hole. This practice is open to many objections. The poison and food are largely wasted through the destruction of the bait by rain or snow or the covering over of the bait caused by the ground being scratched over it and domestic animals, such as chickens, hogs, etc., often get at the poison bait and eat it. Furthermore, wild birds are destroyed to a very large extent by eating gopher poison.

To the end of obviating these objections and providing a safe and effective trap or container for the poison bait we provide a poison holder comprising a container 10 of sheet metal or other suitable material and being circular in cross section and having a downwardly concave bottom, this central container or receptacle being provided with an opening in its top through which poison may be disposed within the receptacle, this opening being closed by a closure 11. Preferably the upper end of the container is reduced in diameter, and the neck is screw-threaded as at 12, the closure being also screw-threaded to engage the neck.

Extending radially from the container and somewhat above the bowl-shaped bottom 13 of the container are the passages or runways 14 which are also made of sheet metal integral with the container or holder proper, these runways being preferably circular in cross section though they may be made of any other convenient form and extending ordinarily a distance of about eight inches from the central container. Adjacent the extremities of these passages or runways 14, the metal of which the passage is formed is folded inward annularly to form an annular inwardly projecting flange 15, this flange being located approximately 1½″ from the extremity of the passage and these annular flanges 15 project inward about ⅜″. With passages or runways 14 three inches in diameter the reservoir will preferably be about six inches in height.

In the practical use of this device, poisoned food is disposed within the bowl-shaped bottom 13 of the container and the cap 12 screwed thereon. The device is then placed in any locality where its use will be effective, the bowl-shaped bottom being embedded somewhat in the ground so as to hold the device upright with the tubular runways or passages resting on the ground. Under these circumstances, gophers or other rodents scenting the poisoned food will crawl into the passages 14 and devour the bait. If the gopher expires within the tube the body may be very readily forced out from the device by inserting a stick into one of the passages and forcing the body out through one of the other passages.

While animals such as gophers, rats, mice, etc., may readily get at the poisoned food yet this bait is thoroughly protected from the effects of rain by being disposed within the container 13 and entirely housed thereby. Furthermore as the tubular passages 14 extend a distance of eight inches or so from the container 13 it is obvious that rain cannot beat into the container itself nor can water flow into the container because of the inwardly extending annular flanges 15. Chickens, cats, dogs, pigs and other domestic animals cannot gain access to the poison for the reason that it is disposed within the inner container and the passages 14 are too long to permit animals of this character to reach the poison and of course the passages are too small to permit the animals to crawl in through the passages.

Preferably the device is held to the ground by a number of pegs 16 having hook-shaped portions 17 which will extend partly around the circular passages 14 and whereby the tank or poison holder may be firmly held in place against accidental displacement. If the annular folds 15 are made sufficiently wide it is obvious that these hooks 17 may be disposed within these folds and thus the device held not only from any lifting movement but from any longitudinal movement also. Where the hooks are inserted within the annular recesses formed by the inwardly extending folds or flanges 15. These hooks 16ª may be T-shaped in cross section to provide an inwardly extending web 17ª engaging in the recesses, thus forming a secure interlock between the hook-shaped peg and the trap. Other devices may of course be used for holding this poison holder in place but the hooks and pegs have been found thoroughly effective for the purpose. These hooks and pegs may be made of cast iron or the pegs might be made of wood with wire hooks. It will be seen that the poison holding tank heretofore described is entirely safe in that only gophers or small rodents can get at the poison contents. Further the poisoned grain or other bait placed in the tank retains its effectiveness until the last kernel of grain is eaten for the reason that the poison is not washed away by rain or damaged by moisture. Again the gopher or other animal is not able to cover up the poisoned grain with earth as is his habit when the grain is placed in front of the hole. It will be obvious that the device may be very cheaply made, that it is convenient to handle and in use it has been found very effective. Any material may be used for the construction of this trap but preferably heavy galvanized iron or tin will be used.

What is claimed is:—

1. A poison holder of the character described comprising a container having a bowl-shaped bottom, the upper end of the container being formed with a screw-threaded neck, a cap engaging said neck, and a plurality of tubular runways opening into the container, the runways being relatively elongated and open at their outer ends and formed to provide an inwardly directed annular flange adjacent the outer end of each runway.

2. A poison holder of the character described comprising a container having a bottom, the upper end of the container being formed with a neck, a cap engaging the neck, and a pair of tubular runways extending at right angles to the vertical axis of the container and disposed in alinement with each other, said runways opening into the container, said container extending downward below the runways, the runways being relatively elongated and open at their outer ends.

3. A poison holder of the character described comprising a container, the upper end of the container being formed with a neck, a cap engaging the neck, and a tubular runway opening into the container, the container extending downward below the bottom of the runway, said runway being relatively elongated and being open at its outer end and formed adjacent its outer end with an inwardly directed annular flange.

In testimony whereof we hereunto affix our signatures in the presence of two witnesses.

WILLIAM HEDRICH.
WALTER STOCK.

Witnesses:
AUGUST J. MUELLER,
SAMUEL C. REAT.